United States Patent
Yin

(10) Patent No.: US 9,948,506 B2
(45) Date of Patent: Apr. 17, 2018

(54) HIGH AVAILABILITY INTERNET SERVICES PROVISIONING

(71) Applicant: Verizon Patent and Licensing Inc., Arlington, VA (US)

(72) Inventor: Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 266 days.

(21) Appl. No.: 15/042,763

(22) Filed: Feb. 12, 2016

(65) Prior Publication Data

US 2017/0237609 A1    Aug. 17, 2017

(51) Int. Cl.
| | | |
|---|---|---|
| H04L 29/06 | (2006.01) | |
| H04L 12/24 | (2006.01) | |
| H04L 29/08 | (2006.01) | |

(52) U.S. Cl.
CPC .......... *H04L 41/0806* (2013.01); *H04L 41/12* (2013.01); *H04L 67/10* (2013.01)

(58) Field of Classification Search
CPC . H04L 65/1069; H04L 69/40; H04L 41/0677; H04L 67/1036
See application file for complete search history.

(56) References Cited

U.S. PATENT DOCUMENTS

| | | | | |
|---|---|---|---|---|
| 6,718,383 B1* | 4/2004 | Hebert | ..................... | H04L 45/22 709/221 |
| 6,728,780 B1* | 4/2004 | Hebert | ................ | G06F 11/2023 709/225 |
| 6,732,186 B1* | 5/2004 | Hebert | ................ | H04L 41/0681 709/226 |
| 6,763,479 B1* | 7/2004 | Hebert | ................ | G06F 11/2005 714/4.11 |
| 7,093,013 B1* | 8/2006 | Hornok, Jr. | ......... | G06F 11/2028 370/241.1 |
| 7,468,984 B1* | 12/2008 | Croak | ................. | H04L 65/1069 370/401 |
| 8,094,789 B2* | 1/2012 | Schroeder | ........... | H04L 12/6418 370/352 |
| 8,582,590 B2* | 11/2013 | Croak | ..................... | H04L 69/40 370/401 |
| 8,606,938 B1* | 12/2013 | Chong | .................... | H04L 41/50 370/252 |

(Continued)

OTHER PUBLICATIONS

Armbrust, Michael, et al. "A view of cloud computing." Communications of the ACM 53.4 (2010): 50-58.*

(Continued)

*Primary Examiner* — Jimmy H Tran

(57) ABSTRACT

Systems and methods described herein provide redundant functionality for multi-cloud high availability continuous service provisioning. Service rule configuration of regional internet services platforms at different geographical locations are provisioned through a multi-cloud provisioning platform. The systems and methods provide that there is no disruption of service provisioning, in the event of a failure of one cloud provisioning platform, as long as at least one other cloud provisioning platform is available. In the event of a cloud disaster outage at one cloud provisioning platform, a regional internet services platform will automatically register with another active cloud provisioning platform.

20 Claims, 9 Drawing Sheets

(56) References Cited

U.S. PATENT DOCUMENTS

| | | | | |
|---|---|---|---|---|
| 8,914,449 B2* | 12/2014 | Gaddam | ................. | H04L 67/26 |
| | | | | 370/331 |
| 9,026,636 B2* | 5/2015 | Chong | ................... | H04L 41/50 |
| | | | | 709/219 |
| 9,198,223 B2* | 11/2015 | Lozinski | ............. | H04L 41/0677 |
| 9,672,123 B2* | 6/2017 | Duggana | ............... | G06F 11/203 |
| 2009/0052638 A1* | 2/2009 | Schroeder | ........... | H04L 12/6418 |
| | | | | 379/88.17 |
| 2010/0064167 A1* | 3/2010 | Chen | ................... | G06F 11/2025 |
| | | | | 714/4.1 |
| 2010/0142410 A1* | 6/2010 | Huynh Van | ......... | H04L 12/4633 |
| | | | | 370/255 |
| 2012/0254421 A1* | 10/2012 | Gagliardi | .......... | G06F 17/30864 |
| | | | | 709/224 |
| 2012/0300770 A1* | 11/2012 | Croak | ................ | H04L 65/1069 |
| | | | | 370/352 |
| 2013/0005311 A1* | 1/2013 | Lozinski | ............. | H04L 41/0677 |
| | | | | 455/414.1 |
| 2013/0117382 A1* | 5/2013 | Gaddam | ................. | H04L 67/26 |
| | | | | 709/206 |
| 2014/0089488 A1* | 3/2014 | Chong | ................... | H04L 41/50 |
| | | | | 709/223 |
| 2014/0095688 A1* | 4/2014 | O'Connor | ........... | H04L 65/1016 |
| | | | | 709/224 |
| 2016/0188425 A1* | 6/2016 | Duggana | ............... | G06F 11/203 |
| | | | | 714/4.11 |

OTHER PUBLICATIONS

Jain, Sushant, et al. "B4: Experience with a globally-deployed software defined WAN." ACM SIGCOMM Computer Communication Review 43.4 (2013): 3-14.*

Ferry, Nicolas, et al. "Towards model-driven provisioning, deployment, monitoring, and adaptation of multi-cloud systems." Cloud Computing (CLOUD), 2013 IEEE Sixth International Conference on. IEEE, 2013.*

Zhang, Qi, Lu Cheng, and Raouf Boutaba. "Cloud computing: state-of-the-art and research challenges." Journal of internet services and applications 1.1 (2010): 7-18. APA.*

Moreno-Vozmediano, Rafael, Rubén S. Montero, and Ignacio M. Llorente. "Key challenges in cloud computing: Enabling the future internet of services." IEEE Internet Computing 17.4 (2013): 18-25.*

* cited by examiner

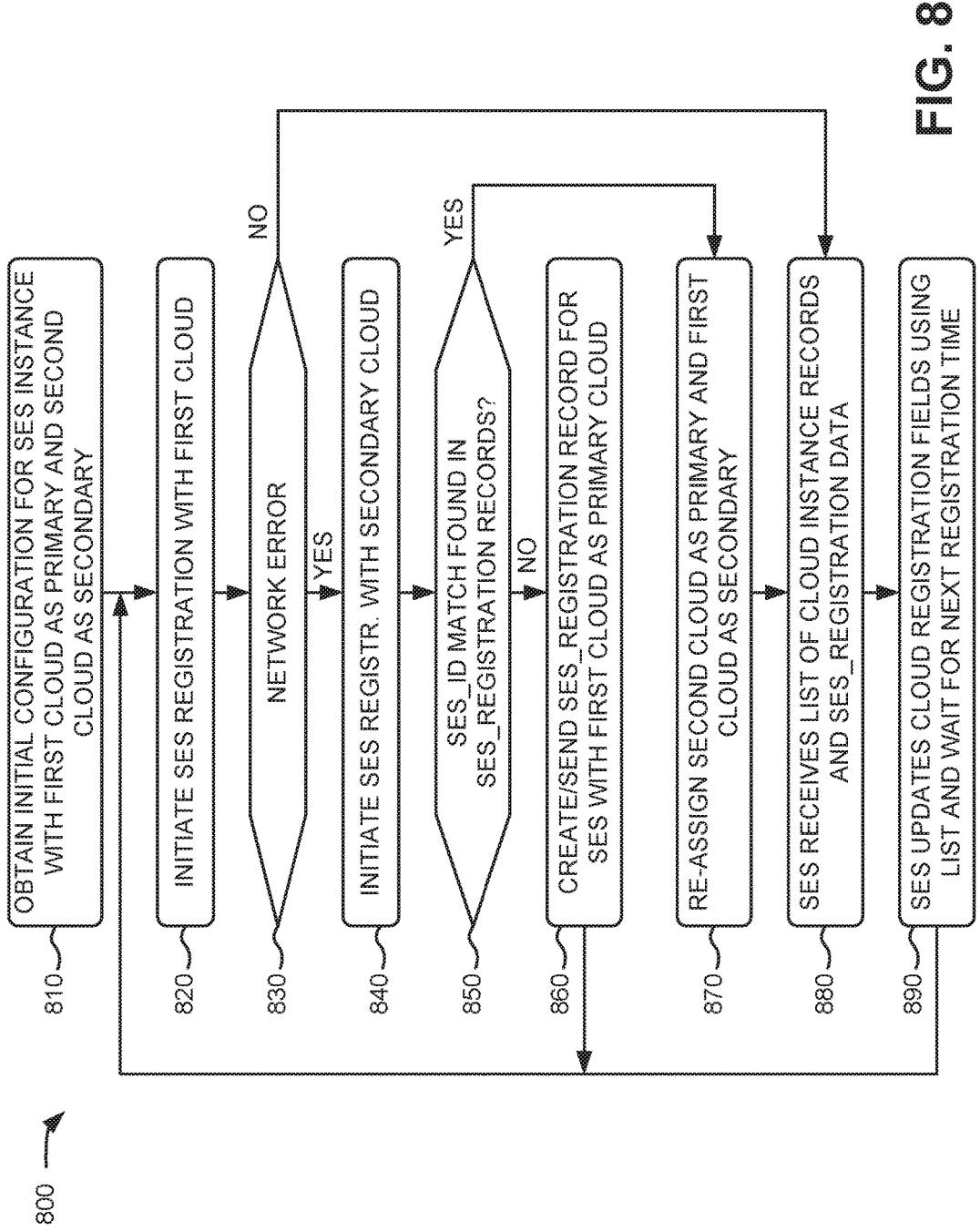

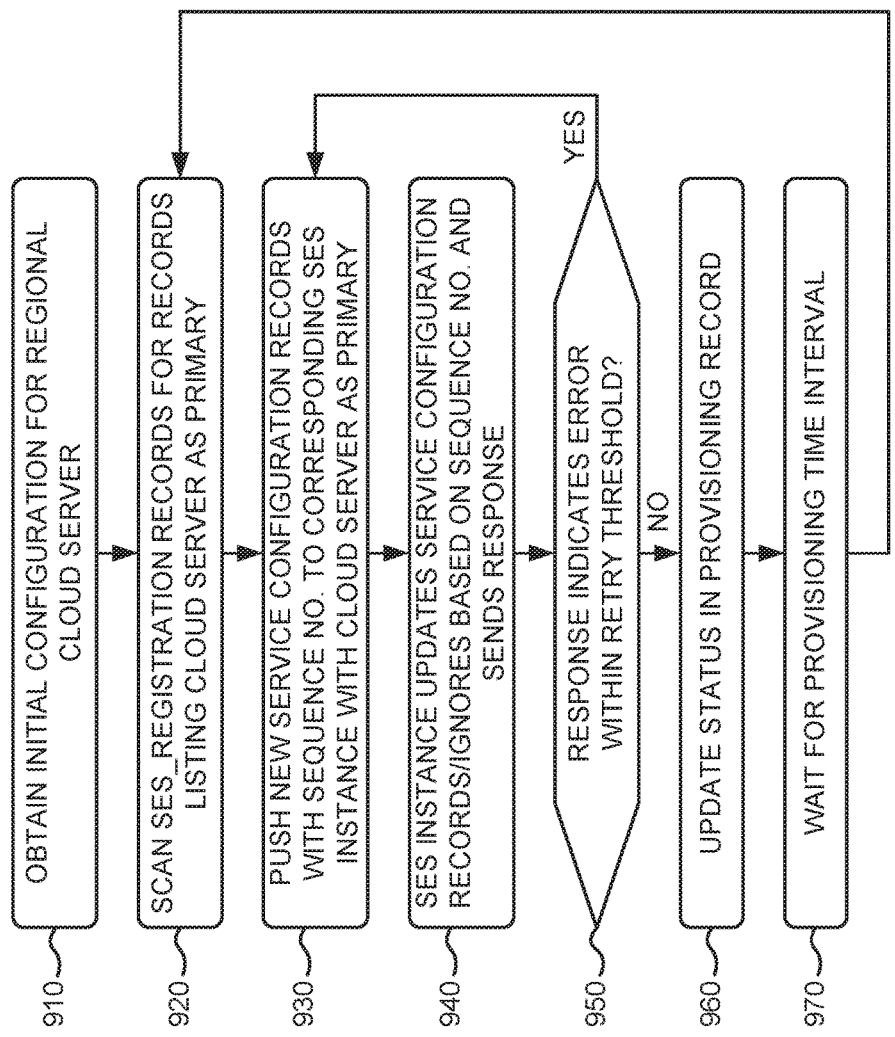

HIGH AVAILABILITY INTERNET SERVICES PROVISIONING

BACKGROUND

Internet services platforms may be provided with both local and geographical high availability redundancy built in. Such platforms may separate data processing and control functionality in both network and service layers. In the network layer, software defined network (SDN) approaches may be used with a centralized control of network configuration. In the service layer, regional internet services platforms are service rule driven, and service rule configuration is also provisioned by a centralized and cloud-based provisioning platform.

BRIEF DESCRIPTION OF THE DRAWINGS

FIG. 8 is a flow diagram that illustrates an exemplary process for registering service enforcement servers with one of multiple service clouds, according to an implementation described herein; and FIG. 9 is a flow diagram that illustrates an exemplary process for provisioning a service enforcement server from one of multiple service clouds, according to an implementation described herein.

DETAILED DESCRIPTION OF THE PREFERRED EMBODIMENTS

The following detailed description refers to the accompanying drawings. The same reference numbers in different drawings may identify the same or similar elements.

Systems and methods described herein provide redundant functionality for multi-cloud high availability continuous service provisioning. Service rule configuration of regional internet services platforms at different geographical locations are provisioned through a multi-cloud provisioning platform. The systems and methods provide that there is no disruption of service provisioning, in the event of a failure of one cloud provisioning platform, as long as at least one other cloud provisioning platform is available. In the event of a cloud disaster outage at one cloud provisioning platform, a regional internet services platform will automatically register with another active cloud provisioning platform.

Implementations described herein provide a multi-cloud high availability service provisioning system architecture and functional flows. The architecture provides flexibility and full automation of service configuration provisioning for regional internet services platforms.

Figure 1:
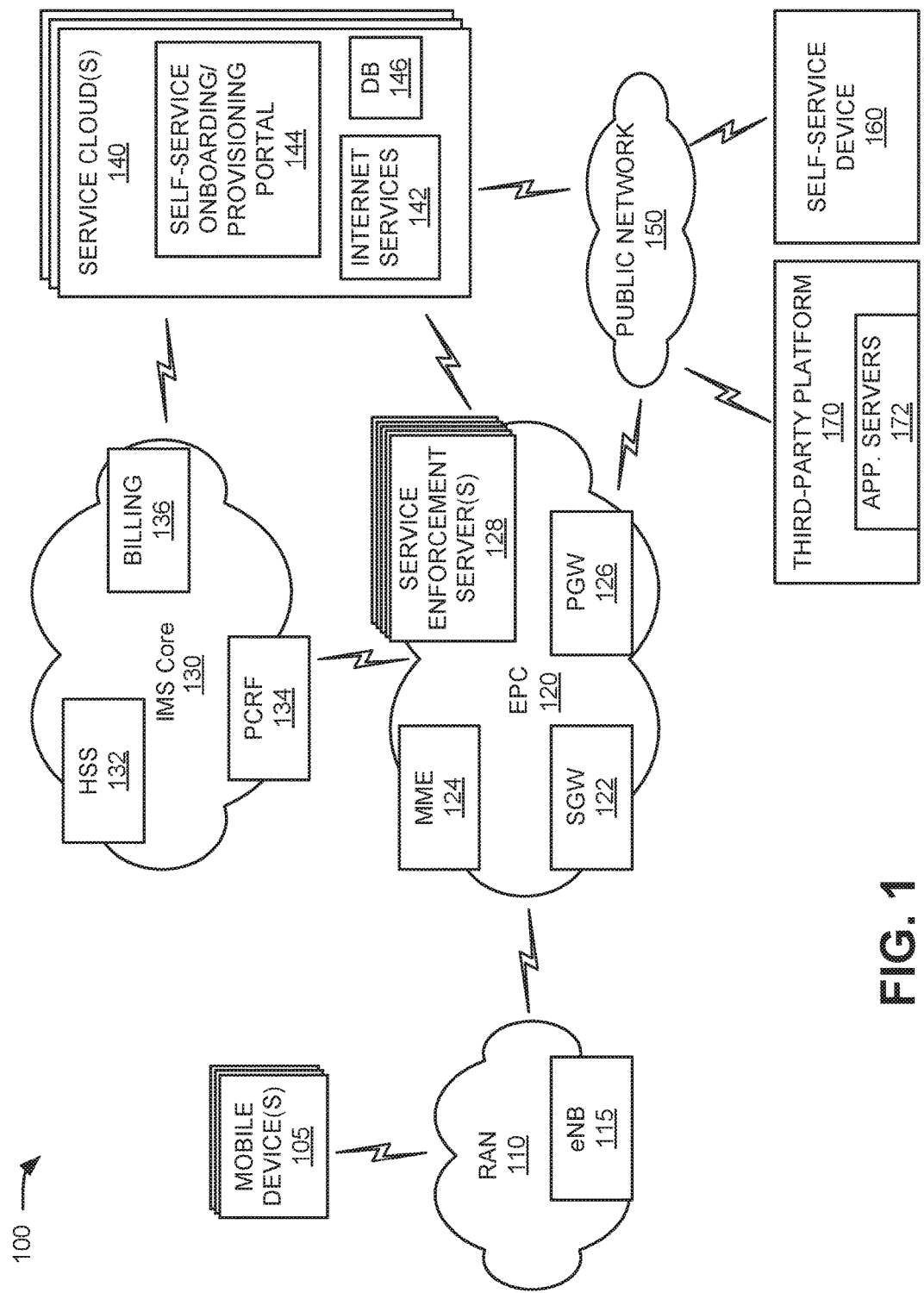
FIG. 1 is a diagram that depicts an exemplary network environment in which systems and methods described herein may be implemented.

FIG. 1 is a diagram that depicts an exemplary network environment 100 in which systems and methods described herein may be implemented. As shown in FIG. 1, network environment 100 may include a mobile device 105; a radio access network (RAN) 110 including an base station (e-Node B) 115 (referred to as an "eNB 115"); an evolved packet core (EPC) network 120 including a serving gateway device 124 (referred to as "SGW 124"), a mobility management entity device 124 (referred to as "MME 124"), a packet data network (PDN) gateway device 126 (referred to as "PGW 126"), and multiple service enforcement servers (SES) 128; an Internet protocol (IP) multimedia subsystem (IMS) core network 130 including a home subscriber server (HSS) 132, a policy and charging rules function (PCRF) server 134, and a billing server 136; multiple service clouds 140 including an Internet services module 142, a self-service onboarding and provisioning portal 144 (referred to as "SSOP portal 144"), and database 146; a data network 150; a self-service device 160; and a third-party platform 170 including application servers 172. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

In some implementations, one or more of the devices of environment 100 may perform one or more functions described as being performed by another one or more of the devices of environment 100. Further, some devices, such as PCRF server 134 and billing server 136, may be integrated into a single device. Devices of environment 100 may interconnect via wired connections, wireless connections, or a combination of wired and wireless connections.

Environment 100 may correspond to an evolved packet system (EPS) that includes multiple regional long term evolution (LTE) networks that operate based on a third generation partnership project (3GPP) wireless communication standard. Each of the LTE networks may include one or more RANs 110 with one or more eNBs 115 via which mobile device 105 communicates with EPC 120 and/or other user devices 110. EPC 120 may enable mobile device 105 to communicate with other mobile devices, IMS core 130, and/or data network 150. Generally, IMS core 130 may manage authentication, security and/or protection protocols, session initiation protocols, account information, network policy enforcement, subscriber profile information, etc. associated with mobile device 105. In one example configuration, network environment 100 may include more than 20) regional EPCs 120, one national IMS core 130, and a few (e.g., no more than 5) service clouds 140, such that each service cloud 140 may act as a primary provisioning source for a small group of regional EPCs 120.

Mobile device 105 may include any computation or communication device, such as a wireless mobile communication device, that is capable of communicating with eNB 115 and/or a network (e.g., data network 150). For example, mobile device 105 may include a radiotelephone, a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. In one example, mobile device 105 may send traffic to and/or receive traffic from the EPS. In another example, mobile device 105 may place calls to other mobile devices 105 and/or receive calls from other mobile devices 105 via the EPS.

eNB 115 (also generally referred to as base stations 115) may include one or more devices that receive, process, and/or transmit traffic, such as voice, video, text, and/or other data, destined for and/or received from mobile device 105. One or more eNBs 115 may be associated with the LTE network that receives traffic from and/or sends traffic to network 185 and/or the IMS core via the EPC. eNB 115 may send traffic to and/or receive traffic from mobile device 105 via an air interface (e.g., via an LTE-Uu interface).

SGW 122 may include one or more devices, or other types of computation or communication devices, that gather, process, search, store, and/or provide information in a manner described herein. SGW 122 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more eNBs 115 and may send the aggregated traffic to data network 150 (e.g., via PGW 126) and/or other devices associated with IMS core 130 and/or EPC 120. SGW 122 may also receive traffic from other network devices and/or may send the received traffic to mobile device 105 via eNB 115. For example, SGW 122 may receive an instruction (e.g., as a result of a registration operation, handoff operation, and/or some other operation) from MME 124 to establish a connection (e.g., a tunnel) that permits mobile device 105 to communicate with other mobile devices 105 and/or network devices associated with the RAN 110, EPC 120, IMS core 130, and/or data network 150.

MME 124 may include one or more devices, or other types of computation or communication devices, that gather, process, search, store, and/or provide information in a manner described herein. For example, MME 124 may perform operations associated with a handoff to and/or from the EPS. MME 124 may perform operations to register mobile device 105 with the EPS, to handoff mobile device 105 from the EPS to another network, to handoff mobile device 105 from the other network to the EPS, and/or to perform other operations. MME 124 may perform policing operations on traffic destined for and/or received from mobile device 105.

PGW 126 may include one or more devices, or other types of computation or communication devices, that gather, process, search, store, and/or provide information in a manner similar to that described herein. PGW 126 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 126 may include a device that aggregates traffic received from one or more SGWs 122 and may send the aggregated traffic to data network 150 and/or IMS core 130. In another example implementation, PGW 126 may receive traffic from data network 150 and may send the traffic to mobile device 105 via SGW 122 and/or eNB 115. PGW 126 may perform policing operations on traffic destined for the EPS.

PGW 126 may receive, from PCRF server 134 and SES 128 (e.g., via a particular interface, such as a Gx interface) policy control and charging (PCC) rules that govern a manner in which a communication session or particular internet-based services, associated with mobile device 105, is to be performed. For example, PGW 126 may communicate with billing server 136 (e.g., via a Gy interface) to monitor the communication session and/or to provide near real-time billing based on an amount of data and/or bandwidth used (e.g., sometimes referred to as megabyte (MB) usage), when the PCC rules include an online charging action. Additionally, or alternatively, PGW 126 may communicate with billing server 136 (e.g., via an Rf interface) to provide billing based on a period of time (e.g., on a per-monthly basis, etc.), when the PCC rules include an offline charging action.

SES 128 may identify user profiles as provided by PCRF 134 to PGW 126 and may forward information regarding these user profiles to internet service module 142. For example, SES 128 may identify IP session records associated with transmission of first verification data or other communications between mobile device 105 and data network 150. SES 128 may identify, based on session records associated with mobile device 105, an MDN or other associated identifier. Each SES 128 (also referred to as an "SES instance") may be support one of several regional sections of EPC 120. For example, each SES 128 may be associated with a particular geographic region (such as a state, multiple states, or parts of a state) and may be the initial SES 128 to manage calls for devices assigned to that region. According to an implementation described herein, each SES 128 may communicate with one regional service cloud 140 at a time (e.g., a designated primary cloud server for the particular SES instance) to receive provisioning and instructions.

HSS 132 may include one or more server devices, or other types of computation or communication devices, that gather, process, search, store, and/or provide information in a manner described herein. For example, HSS 132 may manage, update, and/or store, in a memory associated with HSS 132, service profile information associated with mobile device 105. The service profile information may identify services (e.g., names of services, access point names (APNs), packet data networks (PDNs), etc.) that are subscribed to and/or accessible by mobile device 105; information associated with a user of mobile device 105 (e.g., a username, a password, a personal identification number (PIN), etc.); rate information; minutes allowed; a quantity of data usage (e.g., MB usage) allowed; and/or other information. Additionally, or alternatively, HSS 132 may include a device that performs authentication, authorization, and/or accounting (AAA) operations associated with a call session with mobile device 105.

PCRF server 134 may include one or more server devices, or other types of computation or communication devices, that gather, process, search, store, and/or provide information in a manner described herein. In one example implementation, PCRF server 134 may perform operations that enforce EPS policies associated with a call session with mobile device 105. For example, PCRF server 134 may obtain (e.g., from HSS 132) a subscriber profile that identifies services (e.g., a prepaid voice service, a prepaid data service, a postpaid voice service, a postpaid data service, a prepaid VoIP service, etc.) to which a user, associated with mobile device 105, has subscribed.

The subscriber profile may also identify particular services (e.g., real time reporting (RTR) services, usage control (UC) services, etc.), to which the user has subscribed, that are to be provided when an online charging action is to be performed. PCRF server 134 may use the subscriber profile to generate a charging indicator on which PCC rules, to be applied to the communication session, are based. The charging indicator may include one or more flags, associated with charging actions, that are triggered depending on which services the user has subscribed. The PCC rules may include a charging indicator to identify a charging action to be performed (e.g., an online, an offline, and/or a null charging action) and/or services, associated with a charging action, that are to be provided. The PCC rules may also identify a quantity of bandwidth for use to establish the session, a quality of service (QoS) associated with the session, etc.

Billing server 136 may include one or more server devices, or other types of computation or communication devices, that gather, process, search, store, and/or provide information in a manner described herein. In one example implementation, billing server 136 may store data identifying changes in services and may modify user and device profiles, as applied by HSS 132 and/or PCRF 134 based on the service changes. Billing server 136 may further determine and collect fees associated the requested service changes. For example, PGW 126 may establish a communication with billing server 136 when the charging indicator indicates that an online charging or an offline charging action is to be performed.

Internet services module 142 may include one or more server devices, or other types of computation or communication devices, that gather, process, search, store, and/or provide information in a manner described herein. In one example implementation, internet service module 142 may perform authentication services, toll-free data services, Internet of Things (IoT) services, performance monitoring, and other services for wireless internet access. Internet services module 142 may provide services based on service rule configurations provisioned via SES 128 and SSOP portal 144.

SSOP portal 144 may include one or more network devices, or other types of computation or communication devices, that gather, process, search, store, and/or provide information in a manner described herein. In one example implementation, SSOP portal 144 may include a device for receiving registration data and provisioning instructions from a self-service device 160 (e.g., accessing a portal for providing configuration settings for a customer's internet services). SSOP portal 144 may store provisioning instructions and may push provisioning rules to a local internet services module 142 within service cloud 140. SSOP portal 144 may also periodically push provisioning rules to each SES 128 that has registered with its particular service cloud 140 as primary.

Database 146 may include one or more databases or other data structures to store configuration and provisioning data for devices providing and enforcing internet services in network environment 100. In one implementation, database 146 may store records configuration and provisioning records to implement instructions from customers using self-service device 160 and application servers 172 from third-party platform 170.

Data network 150 may include one or more wired and/or wireless networks. For example, data network 150 may include the Internet, a public land mobile network (PLMN), and/or another network. Additionally, or alternatively, data network 150 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Self-service device 160 may include any computation or communication device that is capable of communicating with SSOP portal 144 and/or a network (e.g., data network 150). Self-service device 160 may provide rules for internet services that are to be applied to, or enforced for, a particular customer. Self-service device 160 may allow customers to provide instructions for internet services that can be implemented in a software-defined networking (SDN)-type environment.

Third-party platform 170 may include one or more application servers 172 that may provide data to or receive data from mobile devices 105 in conjunction with services from internet services module 142. For example, third-party platform 170 may provide content that is subject to toll-free data privileges for particular mobile devices 105. In one implementation, distribution of content from application servers 172 (e.g., within network environment 100) may be subject to rules provided by self-service portal 160.

Figure 2:
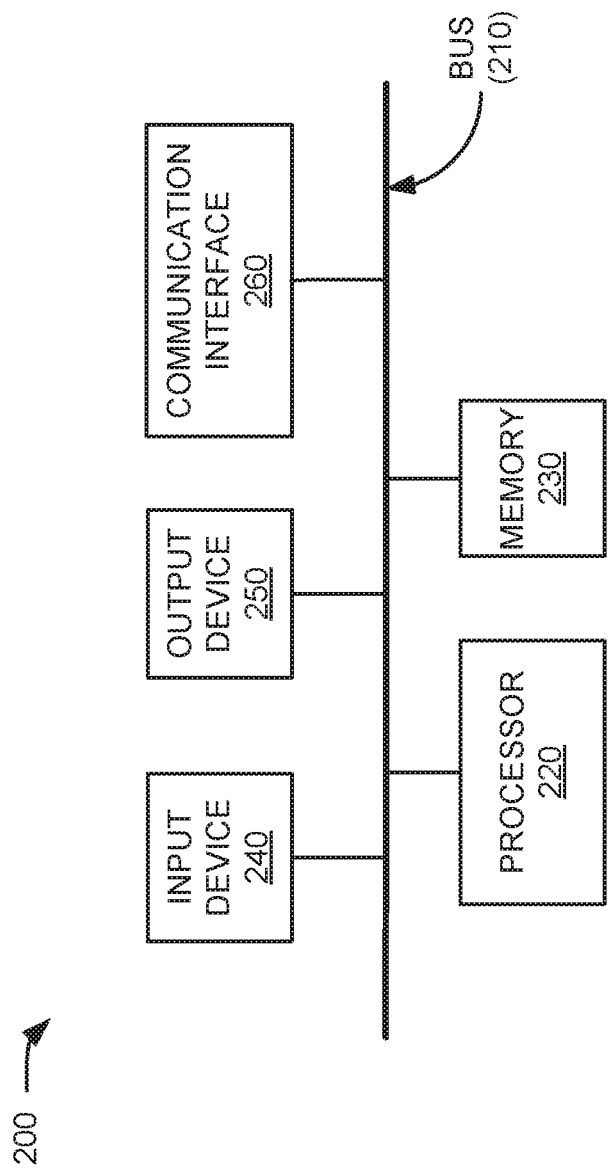
FIG. 2 is a diagram of exemplary components of one of the devices of FIG. 1.

FIG. 2 is a diagram illustrating exemplary components of a computing device 200. Mobile device 105, eNB 115, SGW 122, MME 124, PGW 126, SES 128, HSS 132, PCRF 134, billing server 136, Internet services module 142, and/or SSOP portal 144 may include one or more devices 200 and/or one or more components of computing device 200. As shown in FIG. 2, computing device 200 may include a bus 210, a processor 220, a memory 220, an input component 240, an output component 250, and a communication interface 260.

Bus 210 may include a path that permits communication among the components of computing device 200. Processor 220 may include a processor, a microprocessor, or processing logic that may interpret and execute instructions. Memory 220 may include any type of dynamic storage device that may store information and instructions, for execution by processor 220, and/or any type of non-volatile storage device that may store information for use by processor 220.

Input component 240 may include a mechanism that permits a user to input information to computing device 200, such as a keyboard, a keypad, a button, a switch, etc. Output component 250 may include a mechanism that outputs information to the user, such as a display, a speaker, one or more light emitting diodes (LEDs), etc. Communication interface 260 may include a transceiver mechanism that enables computing device 200 to communicate with other devices and/or systems via wireless communications, wired communications, or a combination of wireless and wired communications. For example, communication interface 260 may include mechanisms for communicating with another device or system via a network. Alternatively or additionally, communication interface 260 may be a logical component that includes input and output ports, input and output systems, and/or other input and output components that facilitate the transmission of data to other devices. In one implementation, user device 105 may include an antenna to exchange signals with base station 210.

Computing device 200 may perform certain operations in response to processor 220 executing software instructions contained in a computer-readable medium, such as memory 220. A computer-readable medium may be defined as a non-transitory memory device. A memory device may include space within a single physical memory device or spread across multiple physical memory devices. The software instructions may be read into memory 220 from another computer-readable medium or from another device. The software instructions contained in memory 220 may cause processor 220 to perform processes described herein. Alternatively, hardwired circuitry may be used in place of or in combination with software instructions to implement processes described herein. Thus, implementations described herein are not limited to any specific combination of hardware circuitry and software.

FIG. 2 shows exemplary components of computing device 200. In other implementations, computing device 200 may contain fewer components, additional components, different components, or differently arranged components than those depicted in FIG. 2. For example, computing device 200 may include one or more switch fabrics instead of, or in addition to, bus 210. In another example, in some implementations, a display may not be included in computing device 200, and in these situations, computing device 200 may be a "headless" device that does not include input component 240. Additionally, or alternatively, one or more operations described as being performed by a particular component of computing device 200 may be performed by one or more other components, in addition to or instead of the particular component of computing device 200.

Figure 3:
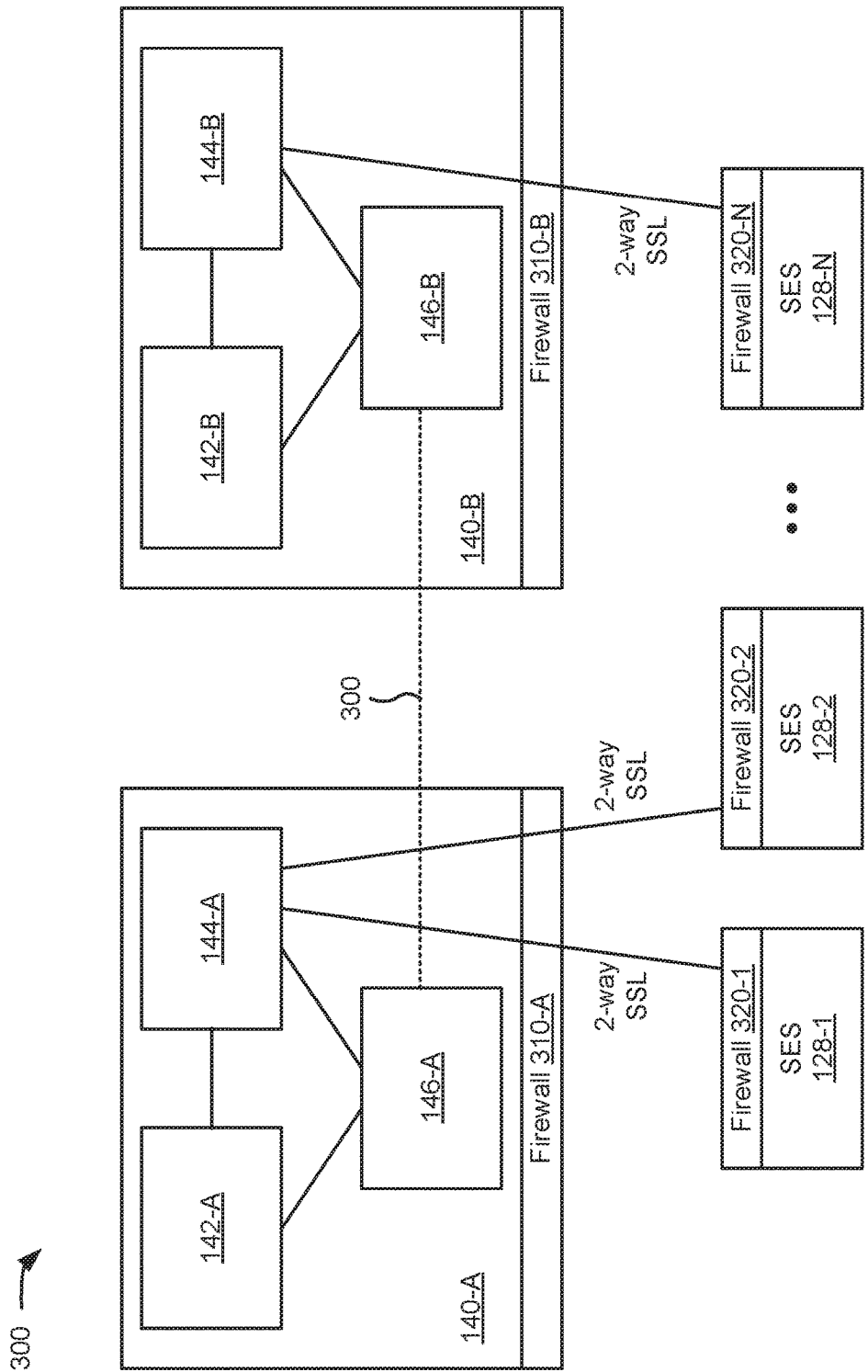
FIG. 3 is a diagram showing communication in a portion of the network environment of FIG. 1.

FIG. 3 is a diagram showing exemplary communications that occur in a portion 300 of network environment 100. Network portion 300 represents a communication framework with two service clouds 140 for provisioning multiple SESs 128. Network portion 300 may include service cloud 140-A (including an Internet services module 142-A, SSOP portal 144-A, and database 146-A), service cloud 140-B (including an Internet services module 142-B, SSOP portal 144-B, and database 146-B), and SES 128-1 through 128-N (where N is a value greater than 1 and referred to generically as SES 128).

Each service cloud 140 may receive provisioning instructions from user devices 160 (not shown in FIG. 3) via a self-service portal, for example. The provisioning instructions may be stored as records in respective databases 146 (e.g., database 146-A and 146-B). Database 146-A and database 146-B may be connected via a virtual private network (VPN) connection 300 through which bi-directional replication is performed (e.g., in real-time or near-real-time).

Each SES 128 may register with one service cloud 140 (e.g., a primary cloud server) from which provisioning rules may be pushed via a secure socket layer (SSL) connection. Each SES 128 may also be assigned to one or more secondary service clouds 140 with which the SES 128 can register if a connection with the primary service cloud 140 cannot be established. Firewalls 310 in service clouds 140 may be configured with the source IP data for each SES 128. Firewalls 310 may prevent access to service clouds 140 by any devices that do not have a recognized source IP address. Similarly, firewalls 310 in each SES 128 may be configured with the source IP data for each service cloud 140. Firewalls 320 may prevent access to SESs 128 from any devices that do not have a recognized source IP address.

Within each service cloud 140, SSOP portal 144 may push provisioning rules to a local internet services module 142. The SSOP portal 144 may also push provisioning rules to each SES 128 that has registered with service cloud 140 as primary. In the configuration of FIG. 3, service cloud 140-A would be the primary for SES 128-1 and 128-2, while service cloud 140-B would be the primary for SES 128-N. In one implementation, the provisioning rules for internet services module 142 may include different information than the provisioning rules for SSES 128.

According to implementations described herein, provisioning instructions received at any service cloud 140 (e.g., via SSOP portal 144) are stored in the respective database 146 and replicated to other databases 146 in other service clouds 140. Each SES 128 may periodically register with one service cloud 140 as primary. At periodic provisioning intervals, each service cloud 140 (acting as a primary) may push new/updated provisioning rules to respective internet services modules 142 and registered SESs 128. If one of service clouds 140 becomes unavailable to an SES 128, the affected SES 128 may register with a secondary service cloud 140. Thus, continuous service provisioning can be available to any SES 128 so long as at least one regional service cloud 140 remains available. The architecture of FIG. 3 provides flexibility and full automation of service configuration provisioning for each regional internet services module 142.

FIG. 3 shows exemplary components of network portion 300. In other implementations, network portion 300 may contain fewer components, additional components, different components, or differently arranged components than those depicted in FIG. 3. For example, network portion 300 may include more than two service clouds 140 with additional internet services modules 142, SSOPs 144, and/or databases 146 included therein. Additionally, or alternatively, one or more operations described as being performed by a particular component of network portion 300 may be performed by one or more other components, in addition to or instead of the particular component of network portion 300.

Figure 4:
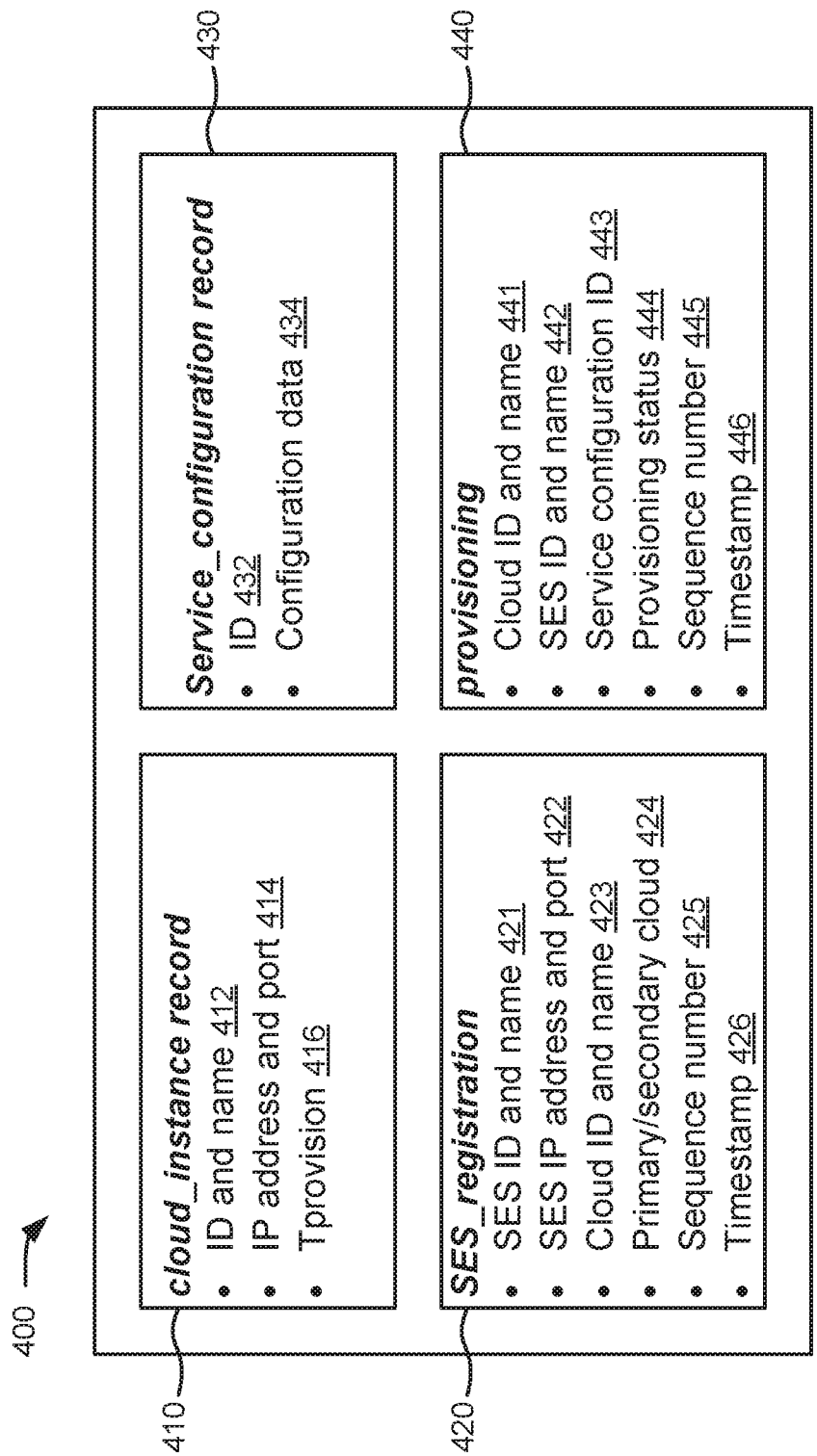
FIG. 4 is a diagram of exemplary data records used by the cloud server of FIG. 1 for multi-cloud service provisioning in the network environment of FIG. 1.

FIG. 4 is a diagram of exemplary data records 400 used by service cloud 140 for multi-cloud service provisioning in network environment 100. As shown in FIG. 4, cloud service provisioning records 400 may include a cloud_instance record 410, a SES_registration record 420, a service_configuration record 430, and a provisioning record 440.

Cloud_instance record 410 provides configuration information for an individual service cloud 140 (e.g., service cloud 140-A, 140-B, etc.). Cloud_instance record 410 may include an ID and name field 412, an IP address and port field 414, and a Tprovision field 416. ID and name field 412 may include a unique identifier and/or name to differentiate an individual service cloud 140 (e.g., service cloud 140-A) from another individual service cloud 140 (e.g., service cloud 140-B). IP address and port field 414 may identify an IP address and port for the particular service cloud 140 indicated in ID and name field 412. Tprovision field 416 may indicate a time period of how frequently the particular service cloud 140 indicated in ID and name field 412 will perform provisioning (or check to see if provisioning is needed) for one or more SES 128.

SES_registration record 420 provides information to enable a particular service cloud 140 to perform lookups to identify and register an SES 128 for provisioning from the particular service cloud 140. SES_registration record 420 may include a SES ID and name field 421, a SES IP address and port field 422, a cloud ID and name field 423, a primary or secondary cloud field 424, a sequence number field 425, and a timestamp field 426. SES ID and name field 421 may include a unique identifier and/or name to differentiate an individual SES 128 (e.g., SES 128-1) from another individual SES 128 (e.g., SES 128-2). SES IP address and port field 422 may include an IP address and port for the SES 128 indicated in SES ID and name field 421. Cloud ID and name field 423 may identify a service cloud 140 that SES 128 is attempting to register with. Primary or secondary cloud field 424 may include an indication of whether the service cloud 140 indicated in cloud ID and name field 423 is a primary or secondary cloud for the SES 128 identified in SES ID and name field 421. Sequence number field 425 may include a sequence number for SES_registration record 420, where each subsequent SES_registration record 420 may be assigned a next higher incremental value. Additionally, or alternatively, timestamp field 426 may include a time that SES_registration record 420 was created.

Service_configuration record field 430 provides configuration settings that are to be included for a particular service. Service_configuration record field 430 may include a service type identifier field 432 and a configuration data field 434. Service type identifier field 432 may include a unique identifier for a type of service that is being provisioned (e.g., a service provided via Internet services 142). Configuration data field 434 may include particular configuration settings for the type of service indicated in service type identifier field 432. For example configuration data field 434 may include rules to govern machine-to-machine communications, toll-free data services, Internet of Things (IoT) communications, or service campaigns for a particular customer.

Provisioning record 440 provides a log of a particular provisioning event. Provisioning record 440 may include a cloud ID and name field 441, a SES ID and name field 442, a service configuration ID field 443, a provisioning status field 444, a sequence number field 445, and a timestamp field 446. Cloud ID and name field 441 may include an ID and name that allows provisioning record 440 to be associated with one of cloud instance records 410. SES ID and name field 442 may include a SES ID and name that allows provisioning record 440 to be associated with one of SES registration records 420. Service configuration ID field 443 may include an identifier that allows provisioning record 440 to be associated with one of service configuration records 430. Provisioning status field 444 may include an indication of success or failure of a provisioning event, where a failure indication may trigger a retry. Sequence number field 445 may include a sequence number for provisioning record 440, where each subsequent provisioning record 440 may be assigned a next higher incremental value. Timestamp field 446 may include a time that provisioning record 440 was created.

Figure 5:
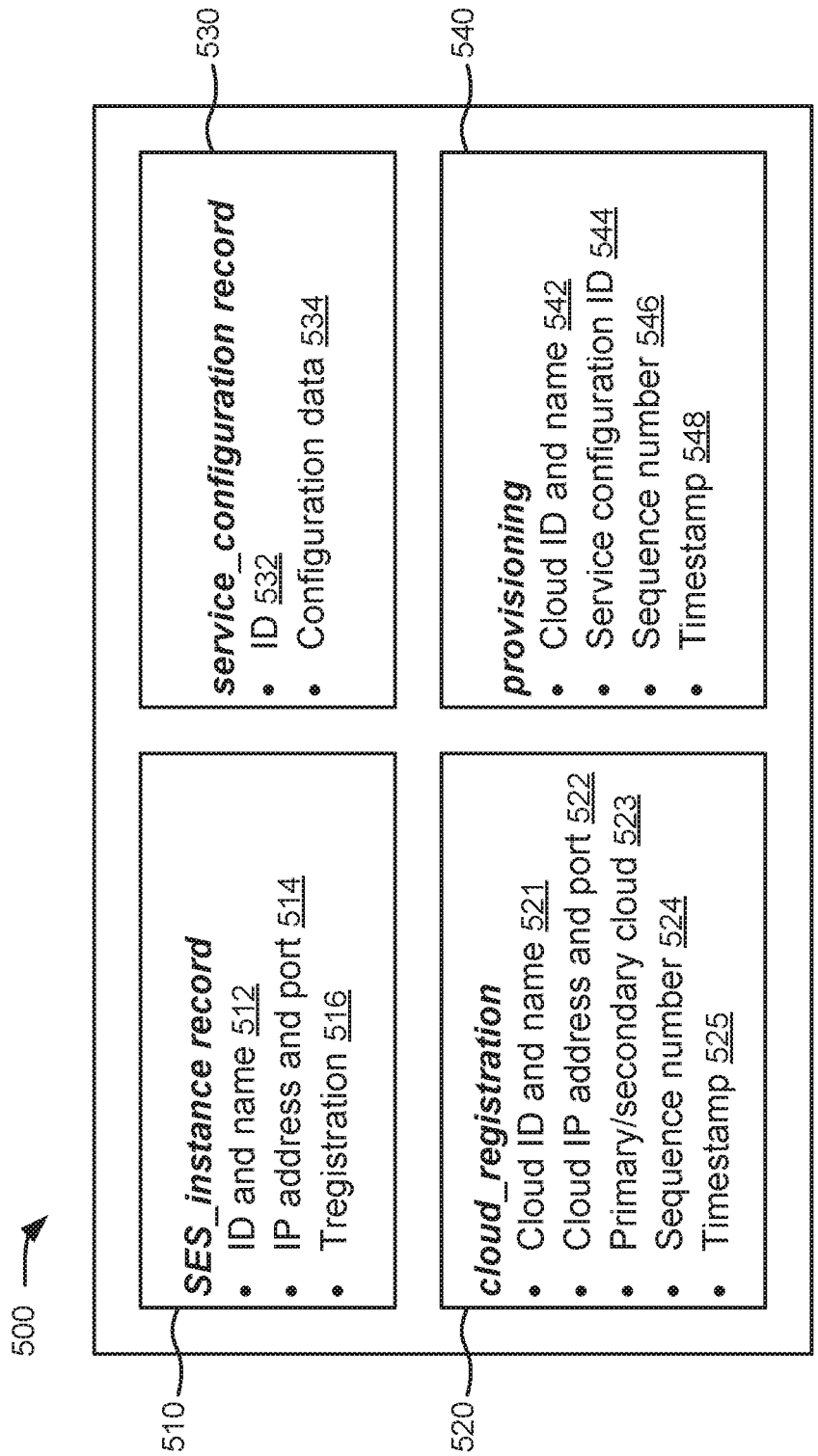
FIG. 5 is a diagram of exemplary data records used by the service enforcement server of FIG. 1 for multi-cloud service provisioning in the network environment of FIG. 1.

FIG. 5 is a diagram of an exemplary data records 500 used by SES 128 for multi-cloud service provisioning in network environment 100. In one implementation, service enforcement records 500 may be included in one or more tables stored and updated locally by each SES 128. As shown in FIG. 5, service enforcement records 500 may include a SES_instance record 510, a cloud_registration record 520, a service_configuration record 530, and a provisioning record 540. In one implementation, SES 128 may maintain separate tables for SES_instance records 510, cloud_registration records 520, service_configuration records 530, and provisioning records 540.

SES_instance record 510 provides configuration information for an individual SES 128 (e.g., SES 128-1, 128-2, etc.). SES_instance record 510 may include an ID and name field 512, an IP address and port field 514, and a Tregistration field 516. ID and name field 512 may include a unique identifier and/or name to differentiate an individual SES 128 (e.g., SES 128-1) from another individual SES 128 (e.g., SES 128-2). IP address and port field 514 may identify an IP address and port for the particular SES 128 indicated in ID and name field 512. Tregistration field 516 may indicate a time period of how frequently (e.g., every 2 minutes, 5 minutes, etc.) the particular SES 128 indicated in ID and name field 512 will perform a registration process with a primary service cloud 140.

Each cloud_registration record 520 provides information to register one of SES 128 with one of a primary service cloud 140 or a secondary service cloud 140. Cloud_registration record 520 may include a cloud ID and name field 521, a cloud IP address and port field 522, a primary or secondary cloud field 523, a sequence number field 524, and a timestamp field 525. Cloud ID and name field 521 may include a unique identifier and/or name to differentiate an individual SSOP portal 144 (e.g., SSOP 144-A) from another individual SSOP portal 144 (e.g., SSOP portal 144-B). Cloud IP address and port field 522 may include an IP address and port for a particular SSOP portal 144 indicated in cloud ID and name field 521. Primary or secondary cloud field 523 may include an indication of whether the SSOP portal 144 indicated in cloud ID and name field 521 is a primary or secondary cloud for the SES 128. Sequence number field 524 may include a sequence number for cloud_registration record 520, where each subsequent cloud_registration record 520 may be assigned a next higher incremental value. Timestamp field 525 may include a time that cloud_registration record 520 was created or updated.

Service_configuration record 530 provides configuration settings that are to be included for a particular service relevant to SES 128. Service_configuration record field 530 may include a service type identifier field 532 and a configuration data field 534. Service type identifier field 532 may include a unique identifier for a type of service that is being provisioned (e.g., a service provided via Internet services 142) and may correspond to service type identifier field 432 of service_configuration record 430. Configuration data field 534 may include particular configuration settings for the type of service indicated in service type identifier field 532 and may correspond to service type identifier field 434 of service_configuration record 430.

Provisioning record 540 provides a log of a particular provisioning event. Provisioning record 540 may include a cloud ID and name field 542, a service configuration ID field 544, a sequence number 546, and a timestamp 548. Cloud ID and name field 542 may include an ID and name that allows provisioning record 540 to be associated with one of cloud_registration records 520. Service configuration ID field 544 may include an identifier that allows provisioning record 540 to be associated with one of service configuration records 530. Sequence number 546 may include a sequence number for provisioning record 540, where each subsequent provisioning record 540 may be assigned a next higher incremental value. Timestamp field 548 may include a time that provisioning record 540 was created or updated.

FIGS. 4 and 5 provide exemplary records 400 and 500. In other implementations, records 400 and 500 may contain fewer fields, additional fields, or different fields than those depicted in FIGS. 4 and 5.

Figure 6:
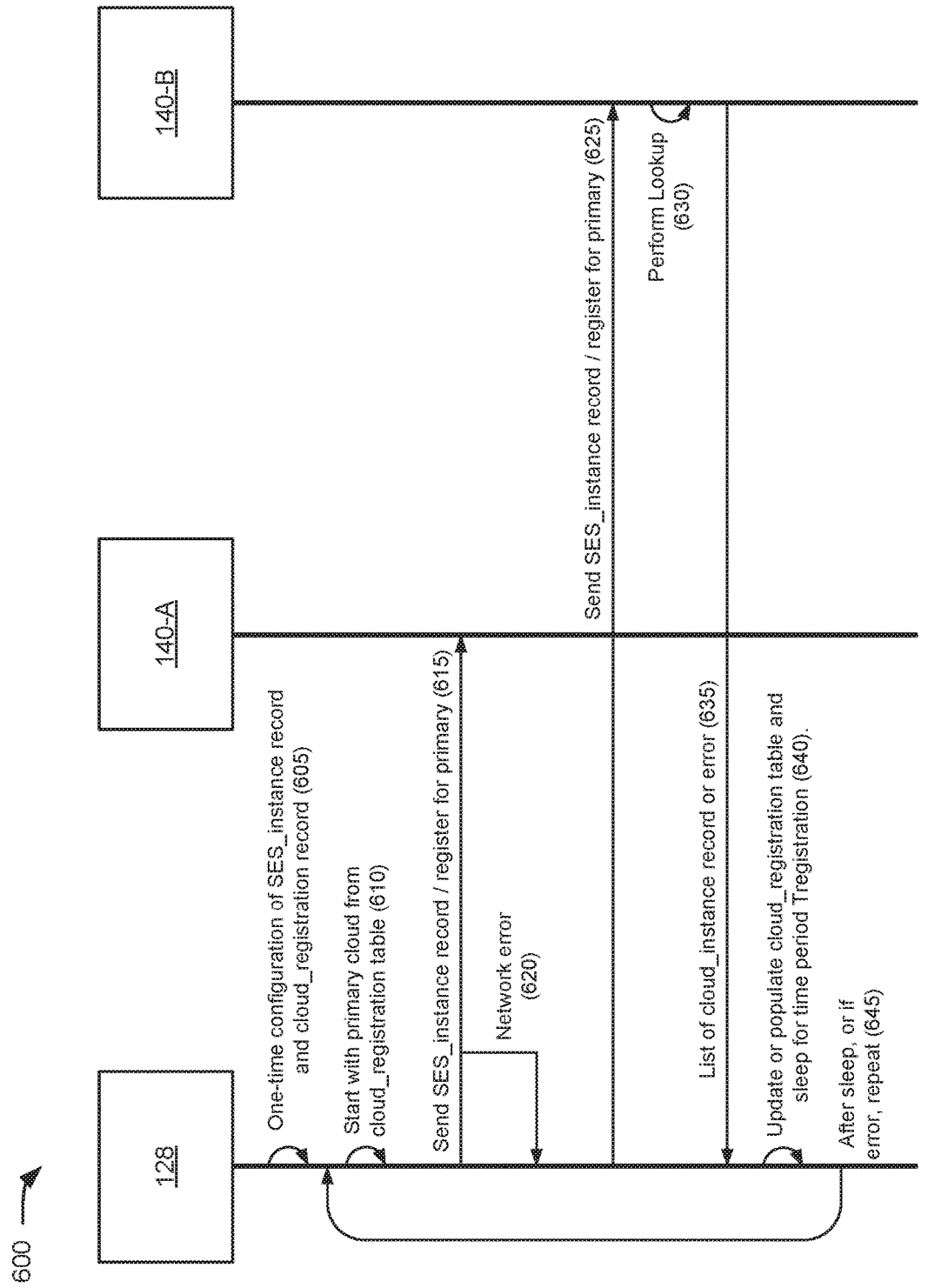
FIG. 6 is a diagram showing communications for a multi-cloud registration process in another portion of the network environment of FIG. 1.

FIG. 6 is a diagram showing exemplary communications for a multi-cloud registration process in a portion 600 of network environment 100. Network portion 600 may include an SES 128, service cloud 140-A, and service cloud 140-B. Communications in FIG. 6 may utilize records 400 and 500 described above in connection with FIGS. 4 and 5. Although not shown expressly in FIG. 6, service clouds 140 may use a respective network device (e.g., SSOP portal 144 with database 146) to perform functions described in FIG. 6.

Referring to FIG. 6, a one-time configuration of a SES_instance record table (including SES_instance records 510 for each SES 128) and a cloud_registration record table (including cloud_registration records 520 for each service cloud 140) may be performed at a regional SES 128, as shown in reference 605. In one implementation, a network administrator may perform the configuration of SES_instance record table to include records 510 with fields 512-516 of FIG. 5 for each SES 128. Additionally, the network administrator may configure the cloud_registration record table to include one cloud_registration record 520 that indicates a primary service cloud 140 (e.g., service cloud 140-A) and one or more other cloud_registration records 520 to indicate secondary cloud servers (e.g., service cloud 140-B) for SES 128.

SES 128 may select, from the cloud_registration record table, a cloud_registration record 520 that indicates the primary service cloud 140, as indicated by reference number 610. Using information from the cloud_registration record 520 for the primary service cloud 140, SES 128 may attempt to register with service cloud 140-A (e.g., the designated primary cloud server), as shown by reference number 615. For example, SES 128 may provide its own SES_instance record 510 to service cloud 140-A to register with service cloud 140-A and enable provisioning of SES 128 from service cloud 140-A. Assume, in the example of FIG. 6, that a network error 620 prevents SES 128 from registering with service cloud 140-A as the primary server for SES 128.

In response to detecting network error 620, SES 128 may use the cloud_registration record table to identify a record 520 for the secondary service cloud 140 and automatically (e.g., without intervention of a network administrator) attempt to register with service cloud 140-B (e.g., the originally-designated secondary cloud server), as shown by reference number 625. Similar to the previous registration attempt, SES 128 may provide its own SES_instance record 510 to service cloud 140-B to register with service cloud 140-B and enable provisioning of SES 128 from service cloud 140-B.

Service cloud 140-B may receive SES_instance record 510 and may perform a lookup of SES_registration records 420, as shown by reference number 630. In performing lookup 630, service cloud 140-B may cross-reference the ID and name field 512 of SES_instance record 510 against SES ID and name field 421 of SES_registration records 420.

Assuming a positive result of lookup 630 (e.g., finding matching SES ID/name in field 421 and field 512), service cloud 140-B may assign itself as the new primary cloud-server 140, update the table of SES_registration records 420 to reflect service cloud 140-B as the new primary server for SES 128 and to reflect that service cloud 140-A is a secondary server. Assuming a negative result of lookup 630 (e.g., not finding a corresponding record 420 with a SES ID and name in field 421 and field 512), service cloud 140-B may create a SES_registration record 420 assigning service cloud 140-A as the primary server. Thus, network portion 600 may overcome and correct errors in the initial configuration (at reference number 605), so long as one of the primary or secondary cloud servers is listed properly.

In response to a successful registration attempt 625 and lookup 630, and as shown by referenced number 635, service cloud 140-B may provide to SES 128 a list of cloud_instance records 410 and for each available service cloud 140 (e.g., cloud sever 140-A and 140-B) and SES_registration data for SES 128 (e.g., from SES_registration records 420).

SES 128 may receive the list of cloud_instance records and SES_registration data and, as shown by reference number 640, may update or populate its table of cloud_registration records 520. The table of cloud_registration records 520 will indicate service cloud 140-B as the new primary cloud server from which SES 128 will accept provisioning. As indicated by reference number 645, SES 128 may then sleep/wait for the time period of Tregistration 516 that was assigned to SES 128 with SES instance record 510.

If SES 128 receives a network error when attempting to register with service cloud 140-B, SES 128 may use the cloud_registration record table to identify a record 520 for another secondary service cloud 140 (not shown in FIG. 6) and attempt to register with another secondary service cloud 140. If no other secondary service clouds 140 are included in the cloud_registration record table, SES 128 may repeat a registration attempt with the primary cloud server from the cloud_registration record table.

Figure 7:
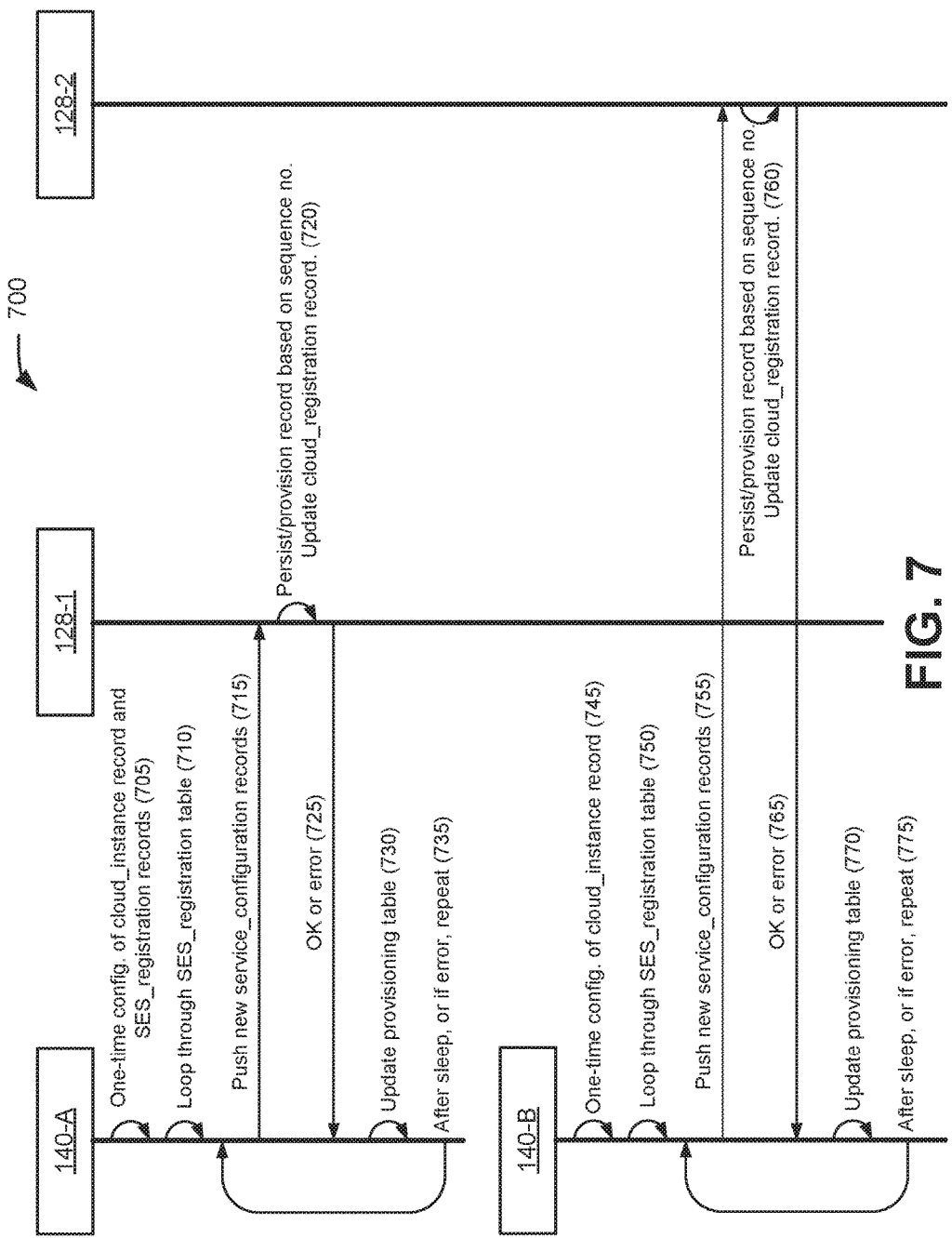
FIG. 7 is a diagram showing communications for multi-cloud service provisioning in another portion of the network environment of FIG. 1.

FIG. 7 is a diagram showing exemplary communications for a multi-cloud provisioning process in a portion 700 of network environment 100. Communications in FIG. 7 may take place, for example, after SES 128-1 and SES 128-2 have completed communications for a registration with a primary service cloud 140 as indicated in FIG. 6. Network portion 700 may include SES 128-1, SES 128-2, service cloud 140-A, and service cloud 140-B. Although not shown expressly in FIG. 7, service clouds 140 may use a respective network device (e.g., SSOP portal 144 with database 146) to perform functions described in FIG. 7.

Referring to FIG. 7, a one-time configuration of a cloud_instance record table (including cloud_instance records 410 for each service cloud 140) and a SES_registration record table (including SES_registration records 420 for each SES 128/service cloud 140 combination) may be performed at service cloud 140-A, as shown in reference 705. In one implementation, a network administrator may perform the configuration of the cloud_instance record table to include records 410 with fields 412-416 of FIG. 4 for each service cloud 140.

As indicated by reference number 710, service cloud 140-A may periodically scan all records in its table of SES_registration records 420 to identify any SES 128 with service cloud 140-A listed as primary (e.g., in fields 423 and 424). The periodicity of each scan may be governed by Tprovision field 416 for cloud instance record 410 that corresponds to service cloud 140-A. For each SES 128 (e.g., SES 128-1) in the table of SES_registration records 420 that has service cloud 140-A listed as primary, service cloud 140-A may push data from new service configuration records 430 (such as ID field 432 and configuration data 434) and provisioning records 440 (such as cloud ID and name field 441, service configuration ID field 443, sequence number field 445, and timestamp field 446) to SES 128-1, as indicated by reference number 715.

As shown by reference number 720, SES 128-1 may receive the configuration records 430 and provisioning records 440 and verify that a sequence number field 445 and/or timestamp field 446 indicates that particular provisioning records 440 are more recent than any corresponding locally-stored provisioning records 540. Assuming a sequence number in field 446 indicates a relevant update, SES 128-1 may update its service_configuration records 530 and provisioning records 540 with the updated information. If the sequence number in field 446 shows information from service cloud 140-A has already been superseded by another record in provisioning records 540 (e.g., based on sequence number field 546), then SES 128-1 may persist in using the service_configuration records 530 and provisioning records 540 associated with the higher sequence number. SES 128 may also update the appropriate cloud_registration record 520 (e.g., with new entries in sequence number field 524 and/or timestamp field 525).

SES 128-1 may respond to service cloud 140-A with an OK message acknowledging a successful provisioning or an error message, as indicated by reference number 725. As shown by reference number 730, service cloud 140-A may receive the OK message or error message and may update its corresponding provisioning record 440 (e.g., provisioning status field 444) to reflect the new status message from SES 128-1 (e.g., change from "pending" to "completed" or "error").

As shown by reference number 735, after successfully pushing new service configuration records to SES 128-1 (and any other SES 128 for which service cloud 140-A is primary), service cloud 140-A may sleep/wait for the time period indicated in Tprovision field 410 and then repeat provisioning for any new or pending updates. If status message 725 indicates an error, service cloud 140-A may not wait before repeating the process.

Still referring to FIG. 7, a one-time configuration of a cloud_instance record table (including cloud_instance records 410 for each service cloud 140) may be performed at service cloud 140-B, as shown in reference 745. In one implementation, a network administrator may perform the configuration of the cloud_instance record table for each of service clouds 140-A and 140-B at the same time.

As indicated by reference number 750, service cloud 140-B may periodically scan all records in its table of SES_registration records 420 to identify any SES 128 with service cloud 140-B listed as primary (e.g., in fields 423 and 424). The periodicity of each scan may be governed by Tprovision field 416 for cloud instance record 410 that corresponds to service cloud 140-B. For each SES 128 (e.g., SES 128-2) in the table of SES_registration records 420 that has service cloud 140-B listed as primary, service cloud 140-B may push data from new service configuration records 430 (such as ID field 432 and configuration data 434) and provisioning records 440 (such as cloud ID and name field 441, service configuration ID field 443, sequence number field 445, and timestamp field 446) to SES 128-2, as indicated by reference number 755.

As shown by reference number 760, SES 128-2 may receive the configuration records 430 and provisioning records 440 and verify that a sequence number field 445 and/or timestamp field 446 indicates that particular provisioning records 440 are more recent than any corresponding stored provisioning records 540. Assuming a sequence number in field 446 indicates a relevant update, SES 128-2 may update its service_configuration records 530 and provisioning records 540 with the updated information. If the sequence number in field 446 shows information from service cloud 140-B has already been superseded by another record in provisioning records 540 (e.g., based on sequence number field 546), then SES 128-2 may persist in using the service_configuration records 530 and provisioning records 540 associated with the higher sequence number. SES 128 may also update the appropriate cloud_registration record 520 (e.g., with new entries in sequence number field 524 and/or timestamp field 525).

SES 128-2 may respond to service cloud 140-B with an OK message acknowledging a successful provisioning or an error message, as indicated by reference number 765. As shown by reference number 770, SES 128-1 may receive the OK message or error message and may update its corresponding provisioning record 440 (e.g., provisioning status field 444) to reflect the new status message from SES 128-2 (e.g., change from "pending" to "completed" or "error").

As shown by reference number 775, after successfully pushing new service configuration records to SES 128-2 (and any other SES 128 for which service cloud 140-B is primary), service cloud 140-B may sleep/wait for the time period indicated in Tprovision field 410 and then repeat provisioning for any new or pending updates. If status message 765 indicates an error, service cloud 140-B may not wait before repeating the provisioning process.

FIG. 8 is a flow diagram that illustrates an exemplary process 800 for registering service enforcement servers with one of multiple service clouds. In one implementation, process 800 may be implemented by SES 128. In another implementation, process 800 may be implemented by SES 128 in conjunction with one or more other devices in network environment 100, such as one or more devices in service clouds 140.

Process 800 may include obtaining an initial configuration for an SES instance with a first cloud as a primary provisioning source and a second cloud as a secondary provisioning source (block 810). For example, a network administrator may perform a one-time provisioning of SES 128 to provide SES_instance records 510 for SES 128 and cloud_registration records 520 that designate primary and secondary service clouds 140.

Process 800 may further include initiating SES registration with the first cloud (block 820) and determining if there is a network error connecting to the first cloud (block 830). For example, as shown in FIG. 6, SES 128 may send a SES instance record 510 to register with the designated primary cloud server (e.g., service cloud 140-A) indicated in cloud registration records 520. SES 128 may determine there is a network error for communications with the primary cloud server. A network error for the primary cloud server may be caused by, for example, a regional catastrophe, such as an earthquake or flood. As another example, a network error for the primary cloud server may be caused by a firewall incorrectly blocking the registration request from SES 128. SES 128 may identify a network error, for example, if there is no response within a timeout period.

If there is a network error (block 830—Yes), then process 800 may include initiating SES registration with the secondary cloud (block 840), and determining if a SES ID match is found in the SES_registration records for the secondary cloud (block 850). For example, referring again to FIG. 6, SES 128 may send SES instance record 510 to register with a designated secondary cloud server (e.g., service cloud 140-B) indicated in cloud registration records 520. If multiple secondary service clouds 140 are available, in one implementation, SES 128 may choose a geographically closest secondary cloud sever 140. The designated secondary cloud server (e.g., service cloud 140-B) may perform a lookup of the SES ID (corresponding to field 512) in SES_registration records 420 to determine if SES 128 has been assigned to a particular service cloud 140.

If no SES ID match is found in the SES_registration records (block 850—No), then a SES_registration record may be created for the SES with the first cloud as the primary cloud (block 860) and process 800 may return to block 820 to initiate SES registration with the first cloud. For example, if the secondary could server (e.g., service cloud 140-B) does not find a corresponding record 420 with a SES ID and name in field 421 that matches SES_instance record 510, service cloud 140-B may create a new SES_registration record 420 assigning service cloud 140-A as the primary server for SES 128. Service cloud 140-B may then provide the updated SES_registration data to SES 128. Thus, service cloud 140-B may provide a correction for communication settings between SES 128 and primary service cloud 140-A, such as a firewall configuration for service cloud 140-A. SES 128 may then initiate registration with the same primary service cloud 140 (e.g., service cloud 140-A) using the updated SES_registration data.

If a SES_ID match is found in the SES_registration records (block 850—YES), then the second cloud may be reassigned as the primary cloud and the first cloud may be reassigned as a secondary cloud (block 870). For example, when a SES ID match is found, it may be presumed that communications between SES 128 and the primary service cloud 140 (e.g., service cloud 140-A) are due to a failure and not due to a network configuration. Thus, the secondary cloud server (e.g., service cloud 140-B) may assume the primary cloud server role and re-assign the original primary cloud server (e.g., service cloud 140-A) to a secondary role (along with any other service clouds 140, not shown) by updating SES_registration records 420.

If there is no network error (block 830—No) or after the second cloud has been reassigned as the primary cloud (block 870), process 800 may also include the SES receiving a list of cloud instance records and SES_registration data (block 880) and updating cloud registration fields using the list and waiting for a next registration time (block 890). For example, in response to a successful registration attempt with either service cloud 140-A or service cloud 140-B, the original or newly-designated primary cloud server may provide to SES 128 a list of cloud_instance records 410 for each available service cloud 140 and SES_registration data for SES 128. SES 128 may receive the list of cloud_instance records and SES_registration data and may update or populate its table of cloud_registration records 520. SES 128 may then sleep/wait for the time period of Tregistration 516 that was assigned to SES 128 in SES_instance record 510.

FIG. 9 is a flow diagram that illustrates an exemplary process 900 for provisioning a service enforcement server from one of multiple service clouds. In one implementation, process 900 may be implemented by one or more devices in a regional service cloud 140. In another implementation, process 900 may be implemented regional service cloud 140 in conjunction with one or more other devices in network environment 100, such as SES 128.

Process 900 may include obtaining an initial configuration for a regional cloud server (block 910) and scanning SES_registration records for records listing the cloud server as primary (block 920). For example, referring to FIG. 7, a one-time configuration of a cloud_instance record table (including cloud_instance records 410 for each service cloud 140) may be performed at service cloud 140-A. In one implementation, a network administrator may perform the configuration of the cloud_instance record table to include records 410 with fields 412-416 of FIG. 4 for each service cloud 140. Service cloud 140-A may periodically scan all records in its table of SES_registration records 420 to identify any SES 128 with service cloud 140-A listed as primary (e.g., in fields 423 and 424).

Process 900 may also include pushing new service configuration records with a sequence number to a corresponding SES instance with the cloud server as primary (block 930), and the SES instance may update its service configuration records and/or ignores the update based on the sequence number and send a response to the regional cloud server (block 940). For example, for each SES 128 (e.g., SES 128-1 of FIG. 7) in the table of SES_registration records 420 that has service cloud 140-A listed as primary, service cloud 140-A may push data from new service configuration records 430 (such as ID field 432 and configuration data 434) and provisioning records 440 (such as cloud ID and name field 441, service configuration ID field 443, sequence number field 445, and timestamp field 446) to SES 128-1. SES 128 may receive the configuration records 430 and provisioning records 440 and verify that a sequence number field 445 indicates that particular provisioning records 440 are more recent than any stored records in corresponding provisioning records 540. Assuming a sequence number in field 446 indicates a relevant update, SES 128-1 may update its service_configuration records 530 and provisioning records 540 and respond to service cloud 140-A.

Process 900 may include determining if the response indicates an error within a retry threshold (block 950). For example, service cloud 140 may be provided a default threshold that defines a number of times service cloud 140 will attempt to provision an SES instance when an error message is received. If the response indicates an error within a retry threshold (block 950—Yes), process 900 may return to block 930 to again push the new service configuration records.

If the response does not indicate an error within a retry threshold (block 950—No), process 900 may update a status in the provisioning record (block 960), and wait for a provisioning time interval (block 970) before returning to block 920. For example, service cloud 140-A may receive the OK message or error message and may update its corresponding provisioning record 440 (e.g., provisioning status field 444) to reflect the new status message from SES 128-1 (e.g., from "pending" to "completed" or "error"). Service cloud 140-A may then wait for the next provisioning period. The periodicity of each scan may be governed by Tprovision field 416 for cloud instance record 410 that corresponds to service cloud 140-A.

According to systems and methods described herein a first regional service cloud (e.g., one of service clouds 140) receives initial configuration data, the initial configuration data identifying the first regional service cloud as a primary cloud to provision a first set of enforcement server devices (one or more SES 128) of multiple regional enforcement server devices and a secondary cloud to provision a second set of enforcement server devices of the multiple regional enforcement server devices. A second regional service cloud (e.g., another one of service clouds 140) also receives the initial configuration data, the initial configuration data identifying the second regional service cloud as a secondary cloud to provision the first set of the enforcement server devices and a primary cloud to provision the second set of the enforcement server devices. The second regional service cloud may receive a registration request from an enforcement server device in the first set of the multiple regional enforcement server devices and may detect if a registration record exists for the enforcement server device. When it is detected that the registration record does not exist for the enforcement server device, the second regional service cloud may create a new registration record associating the enforcement server device with the first regional service cloud as the primary cloud, provide to the enforcement server device the new registration record. The first regional service cloud may then send to the enforcement server device a service configuration record (after the server enforcement device registers again with the first regional service cloud). When it is detected that the registration record exists for the enforcement server device, the second regional service cloud may update the registration record to assign the second regional service cloud as the primary cloud and the first regional service cloud as the secondary cloud, provide to the enforcement server device registration data corresponding to the updated record, and send to the enforcement server device a new service configuration record.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 8 and 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a first network device in a first regional service cloud, initial configuration data, the initial configuration data identifying the first regional service cloud as a primary cloud to provision a first set of enforcement server devices of multiple regional enforcement server devices and a secondary cloud to provision a second set of enforcement server devices of the multiple regional enforcement server devices;
   receiving, by a second network device in a second regional service cloud, the initial configuration data, the initial configuration data identifying the second regional service cloud as a secondary cloud to provision the first set of the enforcement server devices and a primary cloud to provision the second set of the enforcement server devices;
   receiving, by the second network device in the second regional service cloud, a registration request from an enforcement server device in the first set of the multiple regional enforcement server devices;
   detecting, by the second network device in the second regional service cloud, if a registration record exists for the enforcement server device;
   when it is detected that the registration record does not exist for the enforcement server device:
      creating, by the second network device in the second regional service cloud, a new registration record associating the enforcement server device with the first regional service cloud as the primary cloud,
      providing, by the second network device in the second regional service cloud and to the enforcement server device, the new registration record, and
      sending, by the first network device in the first regional service cloud and to the enforcement server device, a service configuration record; and
   when it is detected that the registration record exists for the enforcement server device:
      updating, by the second network device in the second regional service cloud, the registration record to assign the second regional service cloud as the primary cloud and the first regional service cloud as the secondary cloud,
      providing, by the second network device in the second regional service cloud and to the enforcement server device, registration data, corresponding to the updated record, and
      sending, by the second network device in the second regional service cloud and to the enforcement server device, a new service configuration record.

2. The method of claim 1, further comprising:
   receiving, by the enforcement server device, initial configuration settings to identify the first regional service cloud as the primary cloud and the second regional service cloud as the secondary cloud for the enforcement server device;
   sending, by the enforcement server device and using the initial configuration settings, a registration request to the first regional service cloud;
   identifying a network error for the first registration request; and
   sending, by the enforcement server device and using the initial configuration settings, the registration request to the second regional service cloud.

3. The method of claim 2, wherein sending the new service configuration record includes providing a sequence number for the new service configuration record.

4. The method of claim 3, further comprising:
   receiving, by the enforcement server device, the new service configuration record;
   comparing, by the enforcement server device, the sequence number of the new service configuration record with another sequence number of a previously stored service configuration record; and
   rejecting, by the enforcement server device, the new service configuration record when the sequence number of the new service configuration record does not exceed the other sequence number of the previously stored service configuration record.

5. The method of claim 4, further comprising:
   applying, by the enforcement server device, the new service configuration record when the sequence number of the new service configuration record exceeds the other sequence number of the previously stored service configuration record.

6. The method of claim 2, wherein the initial configuration settings further include a registration interval indicating a time period of how frequently the enforcement server device will perform a registration process with a primary cloud server.

7. The method of claim 1, wherein updating the registration record includes providing a sequence number for the registration record.

8. The method of claim 7, further comprising:
receiving, by the enforcement server device, the updated registration record;
comparing, by the enforcement server device, the sequence number of the updated registration record with another sequence number of a previously stored registration record; and
rejecting, by the enforcement server device, the updated registration record when the sequence number of the updated registration record does not exceed the other sequence number of the previously stored registration record.

9. The method of claim 8, further comprising:
applying, by the enforcement server device, the updated registration record when the sequence number of the updated registration record exceeds the other sequence number of the previously stored registration record.

10. The method of claim 1, wherein the initial configuration data further includes a provisioning interval for pushing new service configuration records to first set of the enforcement server devices and the second set of the enforcement server devices.

11. A system comprising, comprising:
a first regional service cloud including one or more network devices, the network devices including a memory and a processor to execute instructions in the memory to:
receive initial configuration data, the initial configuration data identifying the first regional service cloud as a primary cloud to provision a first set of enforcement server devices of multiple regional enforcement server devices and a secondary cloud to provision a second set of enforcement server devices of the multiple regional enforcement server devices,
receive a registration request from an enforcement server device in the first set of the multiple regional enforcement server devices, and
send, to the enforcement server device, a service configuration record; and
a second regional service cloud including one or more other network devices, the other network devices including a memory and a processor to execute instructions in the memory to:
receive the initial configuration data, the initial configuration data identifying the second regional service cloud as a secondary cloud to provision the first set of the enforcement server devices and a primary cloud to provision the second set of the enforcement server devices,
receive another registration request from the enforcement server device,
detect if a registration record exists for the enforcement server device,
when it is detected that the registration record does not exist for the enforcement server device:

create a new registration record associating the enforcement server device with the first regional service cloud as the primary cloud, and
provide, to the enforcement server device, the new registration record, and
when it is detected that the registration record exists for the enforcement server device:
update, by the second regional service cloud, the registration record to assign the second regional service cloud as the primary cloud and the first regional service cloud as the secondary cloud,
provide, by the second regional service cloud and to the enforcement server device, registration data, corresponding to the updated registration record, and
send, by the second regional service cloud and to the enforcement server device, a new service configuration record.

12. The system of claim 11, the enforcement server device being configured to:
receive initial configuration settings to identify the first regional service cloud as the primary cloud and the second regional service cloud as the secondary cloud for the enforcement server device;
send, using the initial configuration settings, a registration request to the first regional service cloud;
identify a network error for the first registration request; and
send, using the initial configuration settings, the registration request to the second regional service cloud.

13. The system of claim 12, wherein the new service configuration record includes a sequence number for the new service configuration record.

14. The system of claim 13, the enforcement server device being further configured to:
receive the new service configuration record;
compare the sequence number of the new service configuration record with another sequence number of a previously stored service configuration record; and
reject the new service configuration record when the sequence number of the new service configuration record does not exceed the other sequence number of the previously stored service configuration record.

15. The system of claim 14, the enforcement server device being further configured to:
apply the new service configuration record when the sequence number of the new service configuration record exceeds the other sequence number of the previously stored service configuration record.

16. The system of claim 12, wherein the initial configuration settings further include a registration interval indicating a time period of how frequently the enforcement server device will perform a registration process with a primary cloud server.

17. The system of claim 11, wherein the updated registration record includes a sequence number for the updated registration record.

18. The system of claim 17, the enforcement server device being further configured to:
receive the updated registration record;
compare the sequence number of the updated registration record with another sequence number of a previously stored registration record; and
apply the updated registration record when the sequence number of the updated registration record exceeds the other sequence number of the previously stored registration record.

19. A non-transitory computer-readable medium containing instructions executable by at least one processing unit, the computer-readable medium comprising one or more instructions for:
- receiving initial configuration data, the initial configuration data:
  - identifying a first regional service cloud as a primary cloud to provision a first set of enforcement server devices of multiple regional enforcement server devices and a secondary cloud to provision a second set of enforcement server devices of the multiple regional enforcement server devices, and
  - identifying a second regional service cloud as a secondary cloud to provision the first set of the enforcement server devices and a primary cloud to provision the second set of the enforcement server devices;
- receiving a registration request from an enforcement server device in the first set of the multiple regional enforcement server devices;
- detecting if a registration record exists for the enforcement server device;
- when it is detected that the registration record does not exist for the enforcement server device:
  - creating a new registration record associating the enforcement server device with the first regional service cloud as the primary cloud,
  - providing, to the enforcement server device, the new registration record, and
  - sending, to the enforcement server device, a service configuration record; and
- when it is detected that the registration record exists for the enforcement server device:
  - updating the registration record to assign the second regional service cloud as the primary cloud and the first regional service cloud as the secondary cloud,
  - providing, to the enforcement server device, registration data, corresponding to the updated record, and
  - sending, to the enforcement server device, a new service configuration record.

20. The non-transitory computer-readable medium claim 19, further comprising one or more instructions for:
- storing, in a database for the second regional service cloud, the service configuration record; and
- replicating, to another database for the first regional service cloud, the service configuration record.

* * * * *